United States Patent [19]
Matsubara et al.

[11] Patent Number: 4,543,708
[45] Date of Patent: Oct. 1, 1985

[54] METHOD OF MANUFACTURING AN ARMATURE

[75] Inventors: Kazunori Matsubara, Sakura; Masanori Yoshizaki, Yachiyo; Takao Mifune, Ichikawa; Kenichi Nakamura, Yachiyo; Yukio Endo; Hidetoshi Takamatsu, both of Funabashi; Yutaka Saito; Takeshi Kawana, both of Yokohama, all of Japan

[73] Assignee: Hitachi, Ltd., Tokyo, Japan

[21] Appl. No.: 565,866

[22] Filed: Dec. 27, 1983

[30] Foreign Application Priority Data

Dec. 27, 1982 [JP] Japan ............................. 57-226842

[51] Int. Cl.$^4$ ............................................. H02K 15/06
[52] U.S. Cl. ............................................. 29/598; 29/605
[58] Field of Search ........................ 29/596, 598, 605; 310/214, 215

[56] References Cited

U.S. PATENT DOCUMENTS 3,348,183 10/1967 Hodges et al. ............... 29/605 X
3,528,171 9/1970 Houtman ........................ 29/596

FOREIGN PATENT DOCUMENTS 147956 11/1980 Japan ........................ 29/596

Primary Examiner—Carl E. Hall
Attorney, Agent, or Firm—Antonelli, Terry & Wands

[57] ABSTRACT

A cushioning member is placed in the open slots formed in a core, weirs are disposed at the ends of teeth located on both sides of each of said open slots, a coil composed of a conductor having an insulation film is disposed in said open slots and between said weirs, and said coil is pressed from the opening of said slot toward the bottom thereof in order to deform the cross-sectional shape of the conductor having insulation film from a circular shape into a non-circular shape.

6 Claims, 9 Drawing Figures

METHOD OF MANUFACTURING AN ARMATURE

BACKGROUND OF THE INVENTION

1. Field of the Invention

The present invention relates to an armature of a rotary electric machine and to a method of manufacturing the armature. The invention is to provide an armature which has conductors of an increased density in the slots of the armature, and which features increased reliability in electric insulation.

2. Description of the Prior Art

To increase the density of conductors in the slots of the armature makes it possible to decrease the slot areas, provided the amount of the conductors remains the same in the slots, and hence to reduce the flux density in the core.

Accordingly, iron losses can be reduced and exciting current can be reduced, to enhance performance of the rotary electric machine. When the performance is maintained the same, the size of the armature core can be reduced and the weight can be reduced to save resources.

For this purpose, a method has already been proposed in U.S. Pat. No. 3,348,183 to Ralph D. Hodges and Francisco C. Avila of producing a coil which helps enhance the conductor density in the slots, by pressing portions of a coil side to change the cross-sectional shape of the conductor from a circular shape into a polygonal shape.

According to this method, a coil side is placed in a ring-like molded member having a hardness greater than that of the coil conductor, and is subjected to the pressing, so that the cross-sectional shape of the conductor is changed from a circular shape into a non-circular shape.

With this method, however, the wires located in the outer periphery and in the inner periphery of the coil side are also deformed from the circular shape into a non-circular shape. Therefore, when a great pressure is exerted, the insulation film applied onto the surface of the electric wire is destroyed and the dielectric strength is greatly deteriorated. In particular, the dielectric strength decreases greatly with a copper wire having a high hardness compared with an aluminum wire. Therefore, the armature in a rotary electric machine loses reliability in insulation. If a reduced pressure is exerted to decrease the amount of deformation thereby to maintain the reliability in insulation, the object will not then be accomplished.

Another method has also been proposed in U.S. Pat. No. 3,515,919 to Jack A. Houtman and Holland Mich.

According to this method, a coil side of a main winding is placed in a slot, and the conductors are plastically deformed. Then, a starting field winding is inserted in space that is formed near the opening of the slot as a result of plastic deformation.

With this method, however, it is not possible to increase the ratio of the sectional area of a coil side to the sectional area of a slot (hereinafter referred to as space factor) in a stator in which one coil side is placed in one slot. This is because the slot is formed in a semi-enclosed shape in which the opening portion is covered by the end of teeth that are located on both sides of the slot. With the semi-enclosed slot, a pressing board for pressing the coil side must have a width greater than the width of the opening of the slot, must be inserted in the slot from the axial direction of the stator core, and must be moved toward the bottom of the slot.

Therefore, if the pressing board is removed from the slot after the coil side has been pressed, the opening portion of the slot simply turns out to be idle space which does not help increase the space factor.

Japanese Patent Publication No. 33786/1983 has been proposed by Teruhisa Motojima and Izumi Shimizu. According to this proposed method, one electric wire is placed in a slot and is pressed by the pressing board, and then another electric wire is placed on the previously pressed electric wire and is pressed by the pressing board. This operation is carried out repetitively to increase the space factor in the slot.

According to this method, however, the electric wire which is initially placed in the bottom of the slot is subjected to the pressing the greatest number of times, and the insulation film thereof is most likely to be destroyed. In small electric machines, furthermore, the stator coil must be wound several tens to several hundreds of times, requiring tremendously long periods of time for the pressing operation.

SUMMARY OF THE INVENTION

The object of the present invention is to provide an armature of a rotary electric machine, which features increased reliability in electric insulation, and a method of manufacturing the same, in order to enhance performance of a rotary electric machine by increasing the density of conductors in the slots of the armature and by efficiently utilizing the slot areas.

Other objects and effects of the present invention can be easily understood from the following description.

The core has a plurality of open slots of a rectangular shape which are open in the inner peripheral surface of the core. In these slots are arrayed a plurality of rows of coils that are wound in the direction of the rows. The conductors of the coils in the open slot are deformed an amount which is at least greater in their surfaces contiguous with each other in the direction of the rows than in their surfaces contiguous with each other in the direction of the stages of the winding. The amount of deformation or deformation quantity of a conductor affects the dielectric strength of the insulation film applied onto the surface of the conductor. That is, the greater the deformation quantity, the smaller the dielectric strength of the conductor coated with the insulation film. The potential difference among the conductors contiguous in the direction of rows is smaller than the potential difference among the conductors contiguous in the direction of steps. Therefore, even if the conductors are deformed more in the direction of rows than in the direction of steps, balance is maintained with respect to the electric insulation in the armature.

A further feature of the present invention resides in that an elastic member is placed in the inner peripheral surfaces of open slots formed in the core, and weirs are positioned at the end of teeth located on both sides of the open slots. The conductor is successively wound in the direction of rows to form a coil which is then inserted into the open slots up to a position between the weirs. Next, the coil is pressed onto the bottom of the slot from between the weirs, so that the conductors of the coil are deformed from a circular shape into a non-circular shape. According to this method of manufacturing the armature, the space factor in the slot can be increased, and an armature having increased reliability in insulation can be obtained.

DESCRIPTION OF THE PREFERRED EMBODIMENTS

Figure 1:
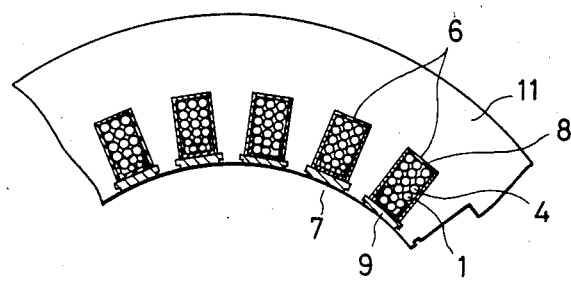
FIG. 1 is a section view showing a portion of an armature according to an embodiment of the present invention.
Figure 2:
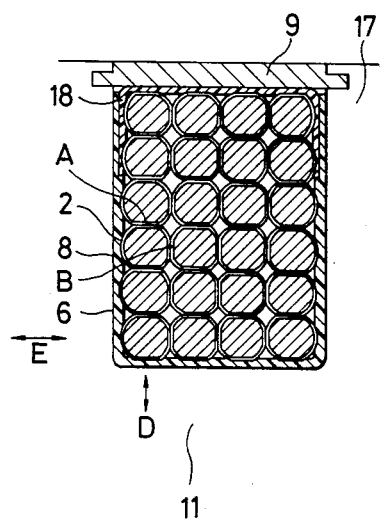
FIG. 2 is a section view showing on an enlarged scale the arrangement of conductors in a slot of the armature of FIG. 1.
Figure 3:
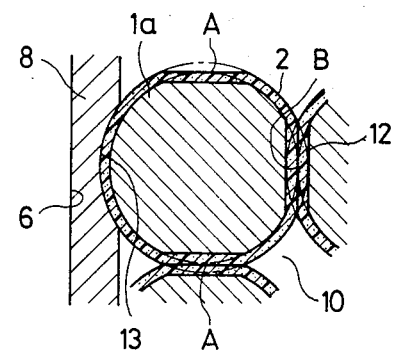
FIG. 3 is a section view showing on an enlarged scale the arrangement of conductors in a slot of FIG. 2.

An embodiment of the present invention will be described below in detail in conjunction with FIGS. 1, 2 and 3.

Open slots 6 having an opening portion 7 are formed in the inner peripheral surface of an armature core 11, and a coil side 4 formed by winding an insulated conductor 1 having a circular shape in cross section is arrayed in the open slots 6. The conductor 1 of the coil side 4 is wound successively in a predetermined number of stages in the direction of rows D. A plurality of rows are disposed in each slot. A cushioning member 8 is provided between the coil side 4 and the core 11. The opening portion 7 has a wedge 9. The insulated electric wires are plastically deformed in cross section, and the insulation film 2 of the insulated conductor 1 in the slot 6 facing the cushioning member 8 has a curved shape relative to the portions at which the conductors are opposed to each other, therefore there is little loss of dielectric strength.

Further, the surfaces A in which the insulated wires contact each other in the direction of rows D are more deformed than the surfaces B in which the insulated wires contact to each other in the direction of stages E.

A rotary electric machine having the thus constructed armature is considered below with regard to the potential difference between the wire and the core, and the potential difference between the wires.

Figure 4:
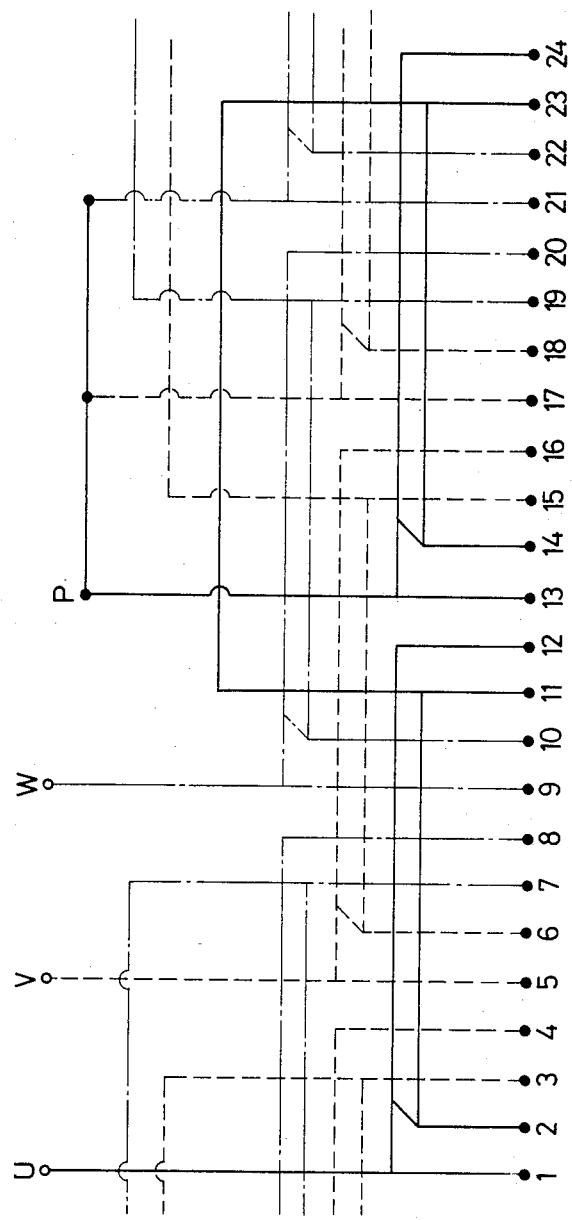
FIG. 4 is a connection diagram which illustrates the arrangement of armature coils and an example of connection, to explain the embodiment of the present invention.

Referring to FIG. 4, reference numerals 1 to 24 denote slots which are formed along the circumference and which are developed laterally in line. In a three-phase armature winding having Y—Y connection, when one coil has 24 turns, each phase has 96 turns since four coils are connected in series.

Below is considered the case when a threephase voltage of 400 volts is applied to the terminals. The potential difference between a terminal U and a neutral point P becomes $400/\sqrt{3}$ volts. Therefore, a maximum potential difference between the core 11 and the conductor 1 becomes about 231 volts. In the conductor arrangement in the slot 6 shown in FIG. 2 however, the potential difference between the neighboring conductors in the direction of rows D becomes $$\frac{400}{96 \times \sqrt{3}} \approx 2.4 \text{ volts.}$$

The potential difference of the neighboring conductors in the direction of stages E becomes $$\frac{400}{96 \times \sqrt{3}} \times 6 = 14.4$$

volts when the rows successively wound in the direction of rows D and the neighboring rows in the direction of stages E have the same winding direction, and becomes a maximum of $$\frac{400}{96 \times \sqrt{3}} \times 12 = 28.9$$

volts when their winding directions are changed alternately.

That is, a maximum potential difference between the core 11 and the conductor 1 is greater than the potential difference between the conductors. However, the insulation film 2 of the conductor 1 facing the cushioning member 8 that is provided between the core 11 and the coil side 4, has a dielectric strength greater than that of the portions contacting to the neighboring conductors 1. Therefore, the armature has excellent reliability in electric insulation. Further, the potential difference between the conductors becomes about 2.4 volts in the direction of rows, and 14.4 volts or 2.4 volts to 28.9 volts in the direction of stages.

The potential difference between the neighboring conductors is greater in the direction of stages than in the direction of rows. As mentioned above, however, the conductors are less deformed in the direction of stages than in the direction of rows. Therefore, the insulation film 2 of the conductors is less deteriorated in the contacting surfaces in the direction of stages than in the contacting surfaces in the direction of rows. In other words, the insulation film 2 of the conductor exhibits a large dielectric strength in the direction of stages in which the potential difference is great between the neighboring conductors, and exhibits a relatively small dielectric strength in the direction of rows in which the potential difference is small. This means that the reduction of dielectric strength caused by the deformation of insulated conductor 1 is restrained, to obtain an armature which features increased space factor in the slots.

It is desired that the rows of the insulated conductor 1 in the slots 6 are wound in the same direction as the neighboring rows wound in the direction of stages, rather than to wind them in the alternately changing directions relative to each other. This is because a maximum potential difference is small among the conductors 1 which are neighboring in the direction of stages.

Further, an insulation member 18 of a rectangular shape (]-shape) with its one side open, is disposed between the coil side 4 in the slot 6 and the wedge 9. The insulation member 18 works to uniformalize the pressure produced by the spring-back action of the insulated conductors 1 exerted on the wedge 9. Therefore, the wedge 9 is prevented from being broken. Or, the thickness of the wedge 9 can be reduced to further increase the space factor.

Moreover, the insulated conductors 1 of the coil side 4 in the slot 6 are arranged in alignment without crossing each other to increase the density of conductors in the slot 6. Namely, the slot areas are efficiently utilized to enhance performance of the rotary electric machine.

The cushioning member 8 provided between the core 11 and the coil side 4 should be more elastic than the core 11 or the conductor 1, so that the insulation film 2 of the conductor 1 will not get scarred, so that the conductor 1 is less deformed, and so that the conductors of the side facing the cushioning member 8 will exhibit excellent dielectric strength.

Use of an insulation material as a cushioning member 8 helps further increase the insulation effect between the core 11 and the conductor 1, and makes it possible to obtain an armature with increased reliability in insulation.

The wedge 9 should be made of a magnetic material. By closing the opening portion 7 of the open slot with the wedge 9 made of a magnetic material, the magnetic reluctance can be reduced and iron losses can be reduced, also.

Figure 5A:
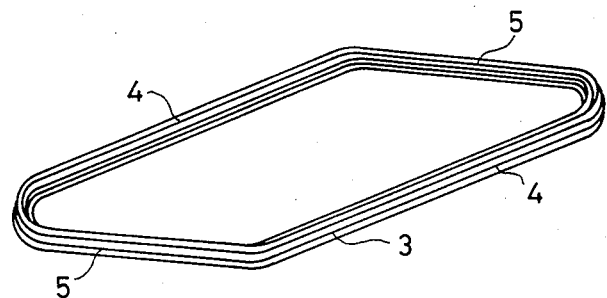
FIG. 5(a) is a diagram showing the appearance of a coil.
Figure 5B:
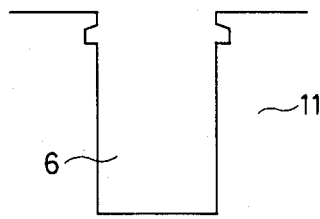
FIG. 5(b) shows a slot in the core.
Figure 6:
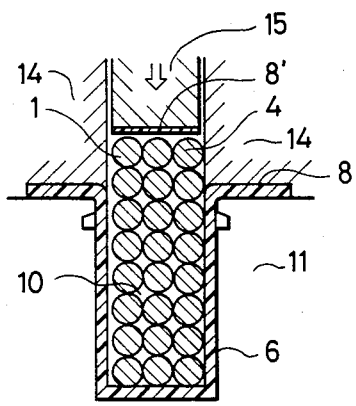
FIGS. 6 and 7 are diagrams illustrating methods of manufacturing the armature according to other embodiments.
Figure 9:
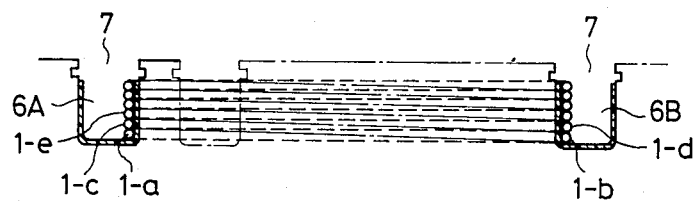
FIG. 9 is a diagram illustrating the order for winding the coil that is arranged in the slots.

The armature is constructed as described below. That is, as shown in FIGS. 5(a), 5(b) and 6, at least the coil side 4 of a coil 3 formed by winding the insulated conductor 1, which will be fitted into the armature slots 6, has conductors that are arranged in alignment without crossing each other. As shown in FIG. 9, the coil side 4 is fitted into the slot 6 in such a manner that the conductor 1 is wound in the order of 1-a, 1-b, 1-c, 1-d, 1-e, ... in the direction of rows which connect the opening portion 7 of the slot 6 to the bottom. FIG. 9 shows the case in which the conductor is wound only in a row in the direction of rows, and other rows are not diagramed. Weirs 14, 14 are disposed at the ends of teeth 17 located on both sides of the slot 6, the cushioning member 8 is disposed in the slot 6, and the above-mentioned coil side 4 is installed in the cushioning member 8. The coil side 4 is located in the slot 6 and between the weirs 14 and 14. Then, a moving piece 15 is moved from between the weirs 14, 14 toward the bottom of the slot 6 to press the coil side 4. As the portions of the conductors 1 facing each other undergo plastic deformation in cross section, gaps 10 surrounded by the conductors 1 reduce, and the density of conductors in the slot 6 increases. The conductors located on the outer periphery of the coil side 4 and contacting the cushioning member 8, bite into the cushioning member 8, whereby contacting areas between the two increase, and the conductors 1 do not receive great force. Therefore, the conductors 1 contacting the cushioning member 8 are plastically deformed less than the conductors 1 which are opposed to each other, and maintain a high dielectric strength.

The moving piece 15 produces the pressure in the direction of rows of the conductor 1 which forms the coil side 4. In the slot 6, therefore, contacting surfaces of the conductors are more deformed in the direction of rows than in the direction of stages. As mentioned earlier, therefore, the conductors 1 are less deformed in the direction of stages in which the potential difference is great among the conductors 1, and are deformed more in the direction of rows in which the potential difference is small among the conductors 1.

Figure 8:
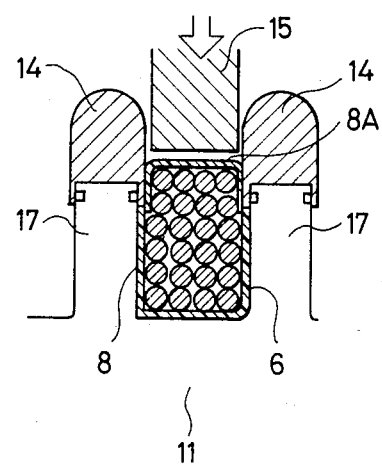
FIG. 8 is a diagram illustrating a method of manufacturing the armature according to a further embodiment of the present invention.

According to a further embodiment of the present invention which is shown in FIG. 8, the weirs 14 are disposed at the end of the teeth 17 located on both sides of the slot 6 in the core 11, the cushioning member 8 is placed in the slot 6, and the coil side 4 is installed in the cushioning member 8 and between the weirs 14 and 14 by winding the conductor in alignment. The coil side 4 is covered with an insulation member 8A of a rectangular shape (]-shape) with its one side open. Then, the coil side 4 is pressed by the moving piece 15 onto the bottom of the slot 6 with the insulation member 8A interposed therebetween. According to this method, the insulation member 8A is fitted into the slot 6 as the coil side 4 is pressed. Namely, the insulation member 8A can be easily inserted even if the space factor is high in the slot 6. Here, the weirs 14 may be replaced by fingers of an inserter that is disclosed in U.S. Pat. No. 4,304,045. The weirs 14 work to guide the coil into the slot 6, as well as to prevent the coil side 4 from moving beyond the slot 6. It has been known, in general, that the insulation members 8, 8A have a larger sliding frictional resistance in the back surface than in the front surface.

The cushioning member 8 should be so placed in the slot 6 that its back surface is faced to the inside to come into contact with the coil side 4. The insulation member 8A also should be so inserted that its back surface comes into contact with the cushioning member 8. That is, the two members exhibit large sliding friction resistances, and the insulation member 8A is prevented from escaping from the slot 6 when the wedge 9 is inserted.

With the insulated conductors 1 of the coil side 4 in the slot 6 being arranged in alignment without crossing each other, the pressure produced by the moving piece 15 is uniformly exerted on the conductors in the lengthwise direction. Therefore, the insulated conductors are plastically deformed less than when the insulated conductors are arranged in a crossing manner. Therefore, the armature exhibits increased reliability in insulation.

Figure 7:
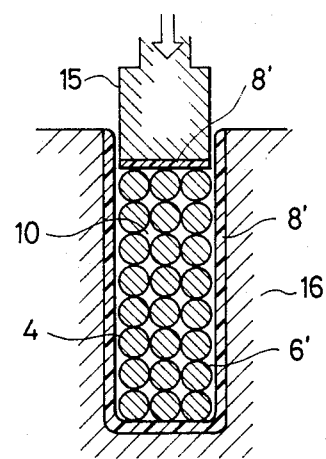

According to a further method of constructing the armature, use is made of a metal mold 16 as shown in FIG. 7. That is, a cushioning member 8' is placed in a slot 6' which is formed in the metal mold 16. The coil side 4 is fitted in the cushioning member 8', and the pressure is produced by the moving piece 15 from the opening portion of the slot 6 onto the bottom thereof. The portions of the conductors 1 facing each other undergo plastic deformation in cross section, and the coil side 4 assumes a predetermined shape. Thereafter, the coil side 4 is taken out from the slot 6' and is transferred into the slot 6 in the armature core.

According to this method by which the coil side 4 is pressed in the metal mold 16, a great pressure can be exerted compared with the method of applying the pressure to the coil side in the armature slot 6, and the pressing apparatus can be simply constructed. However, in case the conductors 1 of the coil side 4 are deformed in small amounts, the coil side 4 is not capable of holding its shape when it is taken out from the slot 6' and there is difficulty in putting the coil side into the slot 6 of the core. In such a case, the coil side 4 should be formed by using an insulated conductor having a spontaneously melt-adhering property, and should be solidified by heating or by using a reaction liquid. The coil side 4 can then be transferred into the slot 6 of the core 11 with increased efficiency. Furthermore, gaps 10 among the conductors decrease if the conductors are plastically deformed in large amounts by the pressing, and if the density of conductors increases in the slot. After the coil side 4 has been fitted into the slot 6, therefore, the varnish which is applied infiltrates little into the gaps 10; i.e., insulation effect by the varnish is not expected. However, if an insulated conductor having a spontaneously melt-adhering property is used and is heated or is treated with a reaction liquid, the films of the conductors melt-adhere to assist the operation for winding of conductor or to protect the films 2 from getting scarred at the time of pressing. Accordingly, reliability in insulation of the armature coil can be further increased.

What is claimed is:

1. A method of manufacturing an armature of a rotary electric machine comprising, placing a cushioning member in an open slot formed in a core, disposing weirs at the ends of teeth located on both sides of said open slot, disposing a side of a coil in said open slot and between said weirs, said coil being made of a conductor which has an insulation film of a synthetic resin and, which is wound through said slot so as to form a plurality of rows of conductor windings with the rows extending in a direction from the bottom of the slot toward the opening thereof, and pressing said side of the coil from the opening of said open slot toward the bottom thereof in order to deform the cross-sectional shape of the conductor windings thereof from a circular shape into a non-circular shape so that the deformation of the cross-sectional shape of the coil winding is greater in the direction of said rows than in the direction at right angles thereto.

2. A method of manufacturing an armature of a rotary electric machine according to claim 1, wherein said weirs consist of fingers of an inserter.

3. A method of manufacturing an armature of a rotary electric machine comprising, placing a cushioning member in an open slot formed in a core, disposing weirs at the ends of teeth located on both sides of said open slot, disposing a side of a coil in said open slot and between said weirs, said coil being made of a conductor which has an insulation film of a synthetic resin and which is wound through said slot so as to form a plurality of rows of conductor windings with the rows extending in a direction from the bottom of the slot toward the opening thereof, covering said side of the coil with a ]-shaped insulation member, and pressing said side of the coil from the opening of said open slot toward the bottom thereof in order to deform the cross-sectional shape of the conductor windings thereof from a circular shape into a non-circular shape so that the deformation of the cross-sectional shape of the coil windings is greater in the direction of said rows than in a direction at right angles thereto, and in order to insert said insulation member into said slot.

4. A method of manufacturing an armature of a rotary electric machine according to claim 3, wherein said weirs consist of fingers of an inserter.

5. A method of manufacturing an armature of a rotary electric machine comprising, winding a conductor which has an insulation film of a synthetic resin through at least one open slot in a metal mold successively from the bottom of the slot toward the opening thereof so as to form a coil with a plurality of rows of conductor windings with the rows extending in a direction from the bottom of the slot toward the opening thereof, pressing the coil from the opening of said slot toward the bottom thereof to deform the cross-sectional shape of said conductor windings from a circular shape into a non-circular shape so that the deformation of the cross-sectional shape of the coil windings is greater in the direction of said rows than in a direction at right angles thereto, and transferring said coil into at least one slot formed in a core.

6. A method of manufacturing an armature of a rotary electric machine according to claim 5, wherein said conductor is coated with a spontaneously melt-adhering insulation film.

* * * * *